(12) United States Patent
Yamada et al.

(10) Patent No.: US 9,231,479 B2
(45) Date of Patent: Jan. 5, 2016

(54) POWER SUPPLY DEVICE

(71) Applicant: FUJI ELECTRIC CO., LTD., Kawasaki-shi (JP)

(72) Inventors: Ryuji Yamada, Hachioji (JP); Nobuyuki Tawada, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 133 days.

(21) Appl. No.: 14/019,221

(22) Filed: Sep. 5, 2013

(65) Prior Publication Data
US 2014/0104889 A1 Apr. 17, 2014

(30) Foreign Application Priority Data

Oct. 12, 2012 (JP) .................................. 2012-226964

(51) Int. Cl.
| | | |
|---|---|---|
| *H02M 1/00* | (2007.01) | |
| *H02M 1/08* | (2006.01) | |
| *H02M 3/158* | (2006.01) | |
| *H02M 3/335* | (2006.01) | |

(52) U.S. Cl.
CPC .............. *H02M 3/335* (2013.01); *H02M 3/158* (2013.01); *H02M 3/33569* (2013.01); *H02M 2001/007* (2013.01)

(58) Field of Classification Search
CPC ............... H02M 2001/0067–2001/008; H02M 2001/007; H02M 3/158
USPC .............................. 323/224, 299–303; 363/37
See application file for complete search history.

(56) References Cited

U.S. PATENT DOCUMENTS

| | | | | |
|---|---|---|---|---|
| 6,512,352 | B2 * | 1/2003 | Qian ............................. | 323/282 |
| 7,061,212 | B2 * | 6/2006 | Phadke ......................... | 323/222 |
| 8,390,261 | B2 * | 3/2013 | Deboy ........................... | 323/224 |
| 8,558,517 | B2 * | 10/2013 | Liquicia et al. ............... | 323/224 |

FOREIGN PATENT DOCUMENTS

| | | |
|---|---|---|
| JP | H02-241371 A | 9/1990 |
| JP | H08-185993 A | 7/1996 |
| JP | 2010-041910 A | 2/2010 |

OTHER PUBLICATIONS

JP 2010-041910, Yamada Ryuji, Power Supply Apparatus, 2010-041910.*

* cited by examiner

*Primary Examiner* — Timothy J Dole
*Assistant Examiner* — Sisay G Tiku
(74) *Attorney, Agent, or Firm* — Rabin & Berdo, P.C.

(57) ABSTRACT

A power supply device includes a first semiconductor switching device for controlling an alternating input current waveform, a smoothing capacitor to which a rectified voltage is applied, and an inverter that converts the rectified voltage into alternating current via a step-up chopper. The step-up chopper includes an inductor and a diode connected between the smoothing capacitor and inverter, and a second semiconductor switching device connected to the inductor and diode. The power supply device further includes an instantaneous voltage drop compensation function whereby the energy of the smoothing capacitor is supplied by an operation of the step-up chopper to the inverter when there is an instantaneous voltage drop in an alternating current power supply voltage. MOSFETs with a breakdown voltage lower than that of the first semiconductor switching device are connected between terminals of the step-up chopper, thus further reducing loss in comparison with when a bypass diode is used.

9 Claims, 6 Drawing Sheets

1: Alternating current power supply
2 to 5, 8, 15 to 18, 206: Diode
6, 19, 22: Inductor
7, 10 to 13, 23: Semiconductor switching device
9, 20, 25: Capacitor
14: Transformer
21: Load
201, 202: MOSFET
203 to 205: Resistor
207: Gate drive circuit
208: Direct current power supply

FIG. 1

1: Alternating current power supply
2 to 5, 8, 15 to 18, 206: Diode
6, 19, 22: Inductor
7, 10 to 13, 23: Semiconductor switching device
9, 20, 25: Capacitor
14: Transformer
21: Load
201, 202: MOSFET
203 to 205: Resistor
207: Gate drive circuit
208: Direct current power supply

POWER SUPPLY DEVICE

BACKGROUND OF THE INVENTION

1. Field of the Invention

The present invention relates to a power supply device having a function of compensating for an instantaneous voltage drop in an alternating current power supply voltage, and specifically, relates to technology for increasing the efficiency and reducing the size of the device.

2. Description of the Background Art

Figure 3:
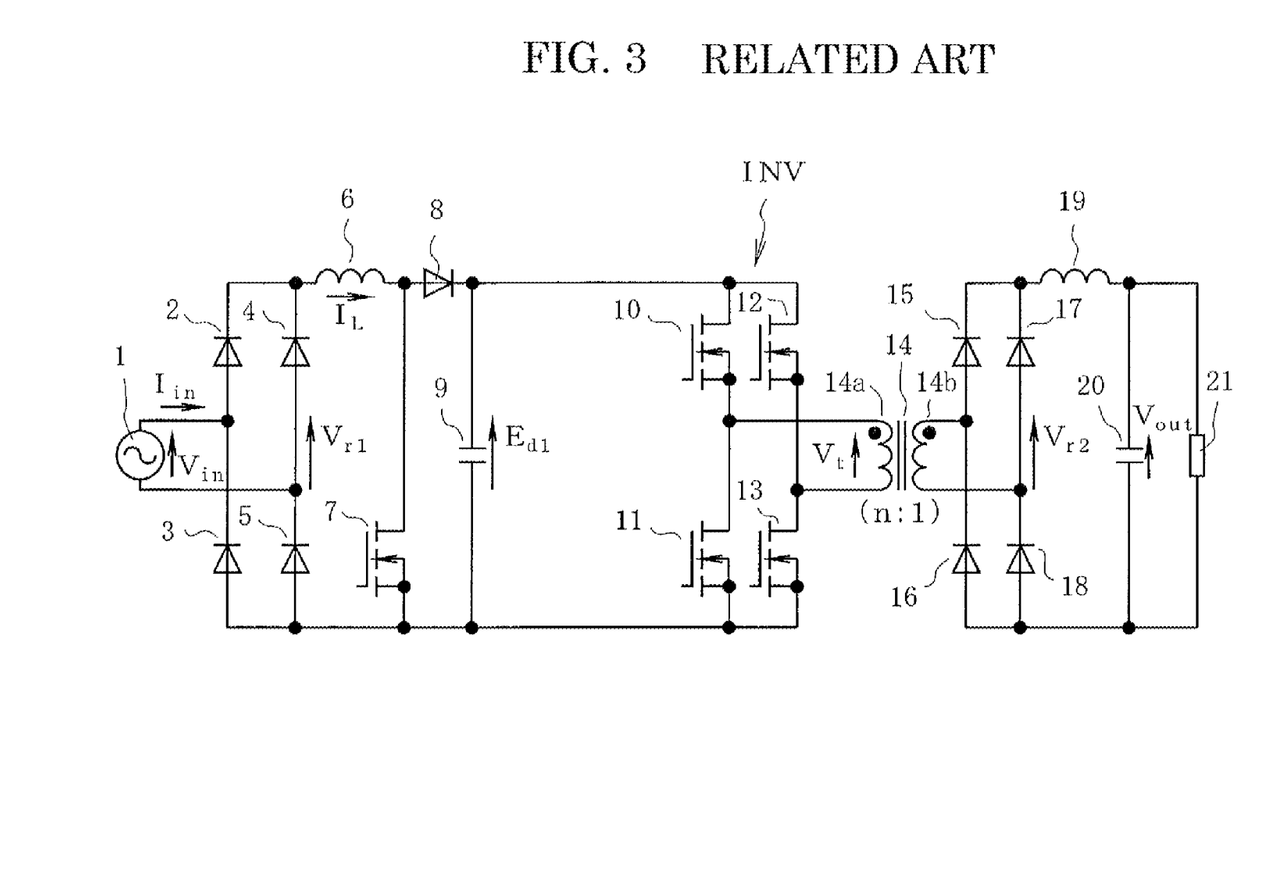
FIG. 3 is a circuit diagram showing first heretofore known technology.

FIG. 3 shows first heretofore known technology of a power supply device having a function of compensating for an instantaneous voltage drop in an alternating current power supply voltage.

In FIG. 3, reference sign 1 is an alternating current power supply, and a rectifier circuit formed of diodes 2 to 5 is connected to both ends of the alternating current power supply. An inductor 6 and a semiconductor switching device 7, such as a MOSFET, are connected in series to either end of a series circuit of the diodes 4 and 5, and a diode 8 and smoothing capacitor 9 are connected in series to either end of the switching device 7.

Direct current input terminals of an inverter INV formed of semiconductor switching devices 10 to 13 are connected to either end of the smoothing capacitor 9, and a primary winding 14a of a transformer 14 is connected to alternating current output terminals of the inverter INV.

A rectifier circuit formed of diodes 15 to 18 is connected to both ends of a secondary winding 14b of the transformer 14. An inductor 19 and a capacitor 20 are connected in series to either end of a series circuit of the diodes 17 and 18, and a load 21 is connected to both ends of the capacitor 20.

Functions required of the above-described power supply device are as follows:

converting an alternating current input voltage to a direct current voltage of a desired size, and keeping output voltage constant regardless of fluctuation in input voltage and load current;

isolating an alternating current input unit and a direct current output unit; and controlling an alternating input current to a sinusoidal wave with a power factor of practically 1.

Furthermore, when the load 21 is one of which reliability is required, as with an information and communication instrument, the power supply device is required to have a function whereby it is possible to maintain a constant output voltage even in the event of a drop in the voltage of the alternating current power supply 1 for a period of in the region of a few milliseconds to a few cycles, a so-called instantaneous voltage drop (this function will hereafter be referred to as an instantaneous voltage drop compensation function).

A description will be given, while referring to FIGS. 4A to 4E, of operations for realizing these functions.

Figure 4A:
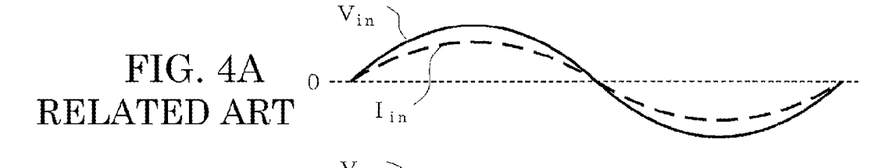
FIGS. 4A to 4E are waveform diagrams showing operations of FIG. 3.
Figure 4B:
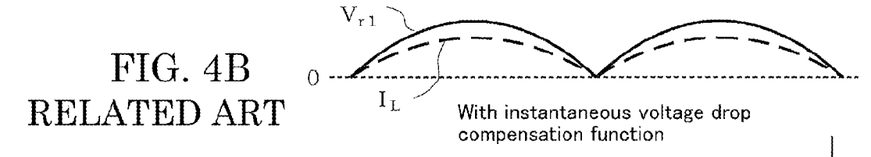

In FIG. 4A, an input voltage $V_{in}$ from the alternating current power supply 1 has a sinusoidal waveform, while the output voltage (rectified voltage) of the rectifier circuit formed of the diodes 2 to 5 has the waveform indicated by $V_{r1}$ in FIG. 4B. Herein, on the switching device 7 of FIG. 3 being turned on when $V_{in}$ has, for example, positive polarity, current flows along a path from the alternating current power supply 1 through the diode 2, inductor 6, switching device 7, and diode 5 to the alternating current power supply 1, the rectified voltage $V_{r1}$ is applied across the inductor 6, and a current $I_L$ increases.

Also, on the switching device 7 being turned off, the current $I_L$ flows along a path from the alternating current power supply 1 through the diode 2, inductor 6, diode 8, smoothing capacitor 9, and diode 5 to the alternating current power supply 1. At this time, a voltage equivalent to the difference between a voltage $E_{d1}$ of the smoothing capacitor 9 and the input voltage $V_{in}$ is applied to the inductor 6, but as $E_{d1}$ is kept higher than a peak value of $V_{in}$ by an operation of the circuit, the current $I_L$ decreases.

It is possible to control the waveform and amplitude of the current $I_L$ by controlling the duty ratio of the turning on and off of the switching device 7. When the waveform of the current $I_L$ is the kind of sinusoidal rectified waveform in FIG. 4B (ripple is ignored for the sake of simplification), an input current $I_{in}$ has a sinusoidal waveform, as shown in FIG. 4A. Also, by controlling the amplitude of $I_L$ in accordance with the load power, it is possible to keep the voltage $E_{d1}$ of the smoothing capacitor 9 constant, and thus possible to keep the output voltage of the inverter INV constant.

Figure 4C:
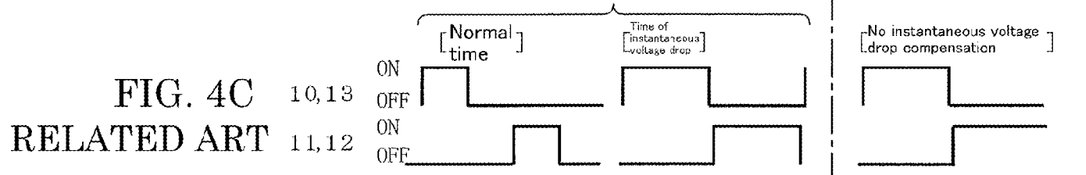
Figure 4D:
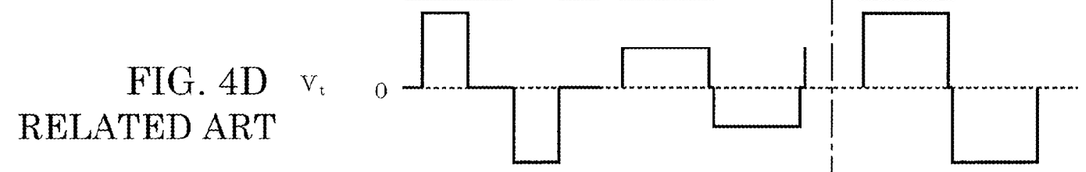
Figure 4E:
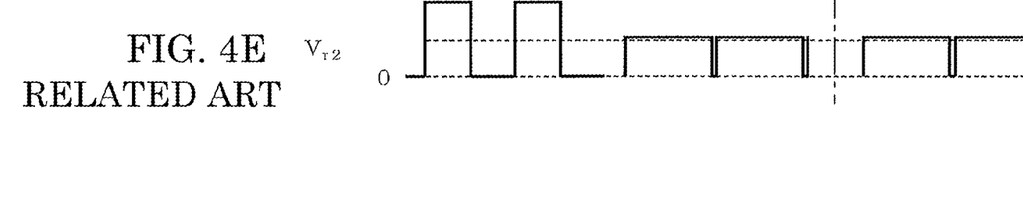

Herein, FIGS. 4C to 4E show operations and voltage waveforms of each portion of the switching devices 10 to 13 when there is and is not an instantaneous voltage drop compensation function.

The inverter INV formed of the switching devices 10 to 13 converts the voltage $E_{d1}$ of the smoothing capacitor 9 into a high frequency alternating current voltage. A positive voltage $V_t$ is applied to the primary winding 14a of the transformer 14 on the switching devices 10 and 13 being turned on, while a negative voltage $V_t$ is applied to the primary winding 14a on the switching devices 11 and 12 being turned on, as shown in FIGS. 4C and 4D. By the positive and negative voltages $V_t$ being applied alternately to the primary winding 14a in this way, the high frequency alternating current voltage $V_t$ is input into the transformer 14 (the cycles of $V_{in}$ and $V_t$ are represented as being of the same extent in FIGS. 4A to 4E for the sake of easier understanding, but in general, $V_{in}$ is of a commercial frequency of 50 or 60 Hz, while $V_t$ is of a frequency of a few kilohertz or more in order to reduce the size of the transformer).

The transformer 14 isolates and transforms the input high frequency alternating current voltage $V_t$ and, after converting the voltage across the secondary winding 14b of the transformer 14 into a rectified voltage $V_{r2}$ of FIG. 4E using the rectifier circuit formed of the diodes 15 to 18, smoothes the voltage using the inductor 19 and capacitor 20, and applies the voltage to the load 21 as an output voltage $V_{out}$. The output voltage $V_{out}$ can be controlled by the duty ratio (hereafter referred to as the inverter duty ratio) of the turning on of the switching devices 10 and 13 or switching devices 11 and 12.

Operations when the power supply device includes an instantaneous voltage drop compensation function and the alternating current power supply 1 is sound are as shown under "Normal time" in FIGS. 4C to 4E.

As opposed to this, under "Time of instantaneous voltage drop", the input power decreases due to the occurrence of an instantaneous voltage drop in the voltage of the alternating current power supply 1, the voltage $E_{d1}$ drops, and the amplitude of the voltage $V_t$ also decreases. However, provided that the drop in the voltage $E_{d1}$ is within a predetermined range, it is possible to keep the average value of the voltage $V_t$ constant by increasing the duty ratio of the turning on of the switching devices 10 and 13 or switching devices 11 and 12, and to maintain the predetermined rectified voltage $V_{r2}$ and, by extension, the output voltage $V_{out}$.

However, when an instantaneous voltage drop compensation function is provided, the efficiency of the device decreases. This is for the following reasons.

In order to maintain the constant output voltage $V_{out}$ even when the voltage $E_{d1}$ has dropped to a certain extent, it is necessary that the transformation ratio of the transformer 14 (the value of n in n:1, which is the turn ratio between the primary winding 14a and secondary winding 14b) is smaller than an essentially known optimum value. For example, when the voltage $E_{d1}$ is kept constant at 400V and the output voltage $V_{out}$ is 10V at a normal time, the transformation ratio of the transformer 14 necessary to operate the inverter INV at a maximum duty ratio is 400:10, that is, n=40 (for the sake of simplification, voltage drop in the circuit is ignored here).

Meanwhile, the transformation ratio necessary in order to maintain the output voltage $V_{out}$ at 10V even when the voltage $E_{d1}$ drops as far as 200V is 200:10, that is n=20. When setting the transformation ratio n under this condition, operation is carried out with an inverter duty ratio of approximately 0.5 in order to maintain $V_{out}$ at 10V at a normal time, when the voltage $E_{d1}$ is 400V.

In this case, the amplitude of current flowing on the primary side of the transformer 14 is 1/n that of current flowing through the inductor 19, but when the power supply device has an instantaneous voltage drop compensation function, the transformation ratio n, whose original optimum value is 40, becomes 20, and the value of current flowing on the primary side of the transformer 14 increases due to the providing of the instantaneous voltage drop compensation function. Because of this, loss occurring in the switching devices 10 to 13 and primary winding 14a increases.

The rectified voltage $V_{r2}$ is approximately $E_{d1}$/n, but as the voltage applied to the diodes 15 to 18 at a normal time increases when the transformation ratio n decreases, it is necessary to use parts with a high breakdown voltage as the diodes 15 to 18. Generally, there is a tendency for loss in a semiconductor part to increase under the same conditions the higher the breakdown voltage, because of which loss occurring in the device increases.

Also, at a normal time and when there is an instantaneous voltage drop compensation function, a period for which the voltage $V_{r2}$ is not applied lengthens, because of which the value of the inductance of the inductor 19 necessary in order to smooth the voltage $V_{r2}$ increases. In the case in which there is no instantaneous voltage drop compensation function in FIGS. 4D and 4E, the rectified voltage $V_{r2}$ is not applied for the very short time in which the polarity of the voltage $V_t$ switches in the period during which the rectified voltage $V_{r2}$ drops from a predetermined value to 0V, but at a normal time and when there is an instantaneous voltage drop compensation function, the rectified voltage $V_{r2}$ is not applied for a period equivalent to one-half of one cycle, and for this period it is necessary that energy is supplied to the load 21 by the inductor 19.

For these reasons, the inductor 19 increases in size, which results in an increase in the overall size of the device and an increase in loss occurring in the inductor 19.

Figure 5:
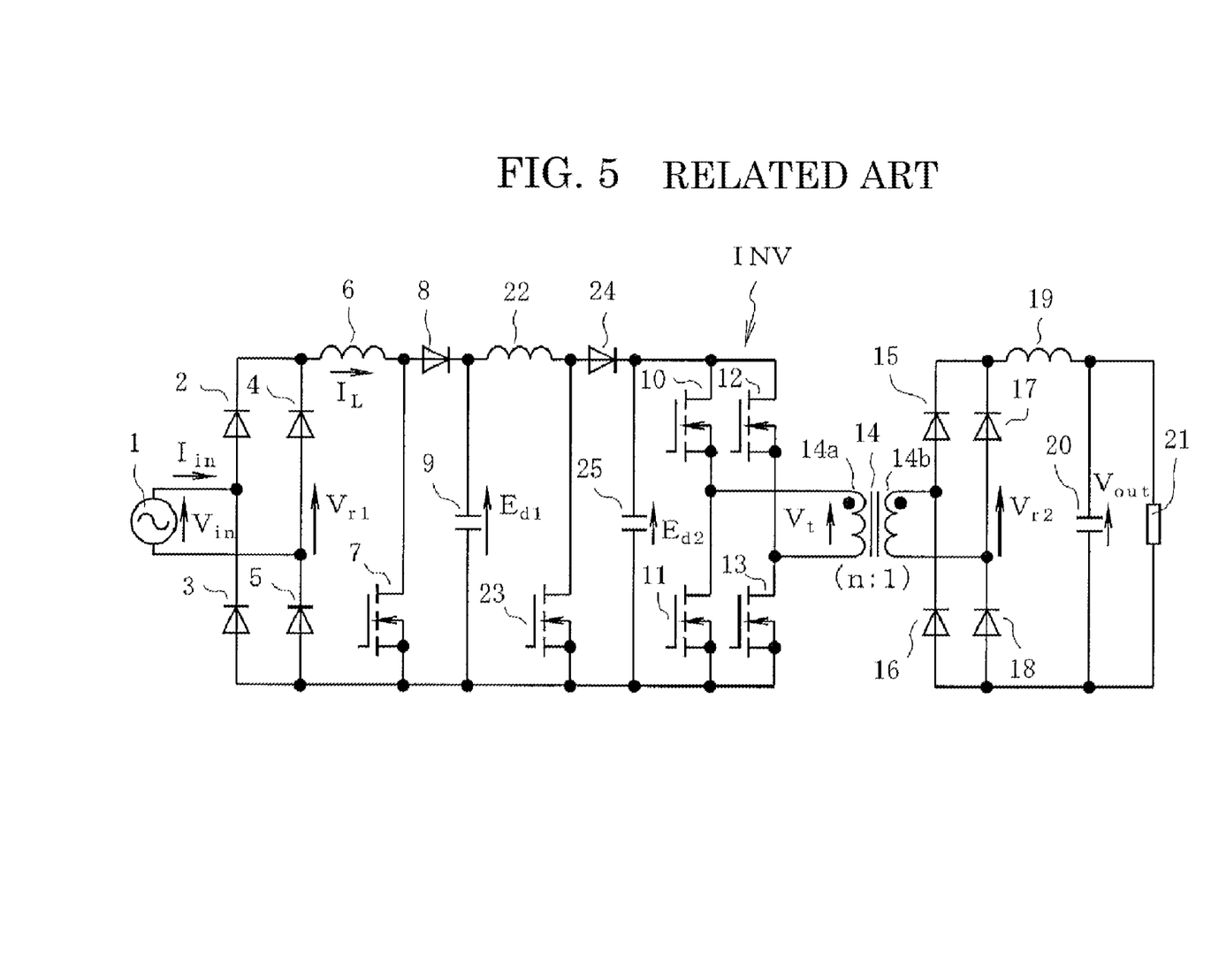
FIG. 5 is a circuit diagram showing second heretofore known technology.

The circuit shown in FIG. 5 is known as second heretofore known technology whereby the above-described kind of increase in loss from the inverter INV onward is avoided.

In FIG. 5, an inductor 22 and a diode 24 are connected in series to a positive side direct current bus between the smoothing capacitor 9 and inverter INV, and a semiconductor switching device 23 is connected between a connection point of the inductor 22 and diode 24 and a negative side direct current bus. Also, a smoothing capacitor 25 is connected between the cathode of the diode 24 and the negative side direct current bus. A step-up chopper is configured of the inductor 22, diode 24, switching device 23, and smoothing capacitor 25. As the other configurations in FIG. 5 are the same as in FIG. 3, a description thereof will be omitted.

It is possible to control current flowing through the inductor 22 with the step-up chopper, using the same kind of operation as that of the circuit formed of the inductor 6, switching device 7, and diode 8, as a result of which it is possible to obtain an output voltage $E_{d2}$ higher than the input voltage $E_{d1}$. That is, using an operation of the step-up chopper, it is possible to keep the voltage $E_{d2}$ of the capacitor 25 constant (for example, 400V) even when the voltage $E_{d1}$ of the capacitor 9 drops (for example, from 400V to 200V) when there is an instantaneous voltage drop in voltage, and a design wherein the transformation ratio is n=40 is possible in the previously described example.

A circuit wherein a drop in alternating current power supply voltage is compensated for using the above-described step-up chopper is shown in JP-A-2-241371 (page 2, bottom right column, line 1 to page 3, top left column, line 4, FIG. 2 and the like).

However, the circuit shown in FIG. 5 has the following drawbacks.

That is, the inductor 22, switching device 23, and diode 24 configuring the step-up chopper generate loss. While inevitable in a case in which the switching device 23 is carrying out a turning on or turning off operation, loss also occurs when the voltage $E_{d1}$ is sufficiently high and the switching device 23 is stopped, due to the winding resistance of the inductor 22 and the forward voltage drop of the diode 24. Because of this loss, the amount by which the circuit loss from the inverter INV onward is reduced is cancelled out.

Also, as current is constantly flowing through the inductor 22, an inductor 22 with a large current capacity is needed, despite the time for which the stepping-up operation is carried out being extremely short.

Furthermore, a large capacity smoothing capacitor 25 is needed in order to absorb ripple current generated from the inverter INV. As the one smoothing capacitor 9 has a sufficiently large capacity in order to supply energy when there is an instantaneous voltage drop, the smoothing capacitor 9 can perform the role of absorbing both the ripple current generated by the circuit formed of the inductor 6, switching device 7, and diode 8 and the ripple current of the inverter INV in the circuit of FIG. 3.

However, as the inductor 22 is inserted between the inverter INV and smoothing capacitor 9 in the circuit of FIG. 5, a high frequency ripple current can not pass. Because of this, the separate smoothing capacitor 25 is needed, because of which the size of the device increases.

A circuit wherein energy when there is an instantaneous voltage drop is supplied by another capacitor charged in advance is shown in JP-A-8-185993 (paragraphs [0023] to [0028], FIG. 1 and the like). However, as the circuit disclosed in JP-A-8-185993 (paragraphs [0023] to [0028], FIG. 1 and the like) is also such that a capacitor that absorbs ripple at a normal time and a capacitor that supplies energy when there is an instantaneous voltage drop are separated, it is not possible to avoid an increase in the size of the device.

Figure 6:
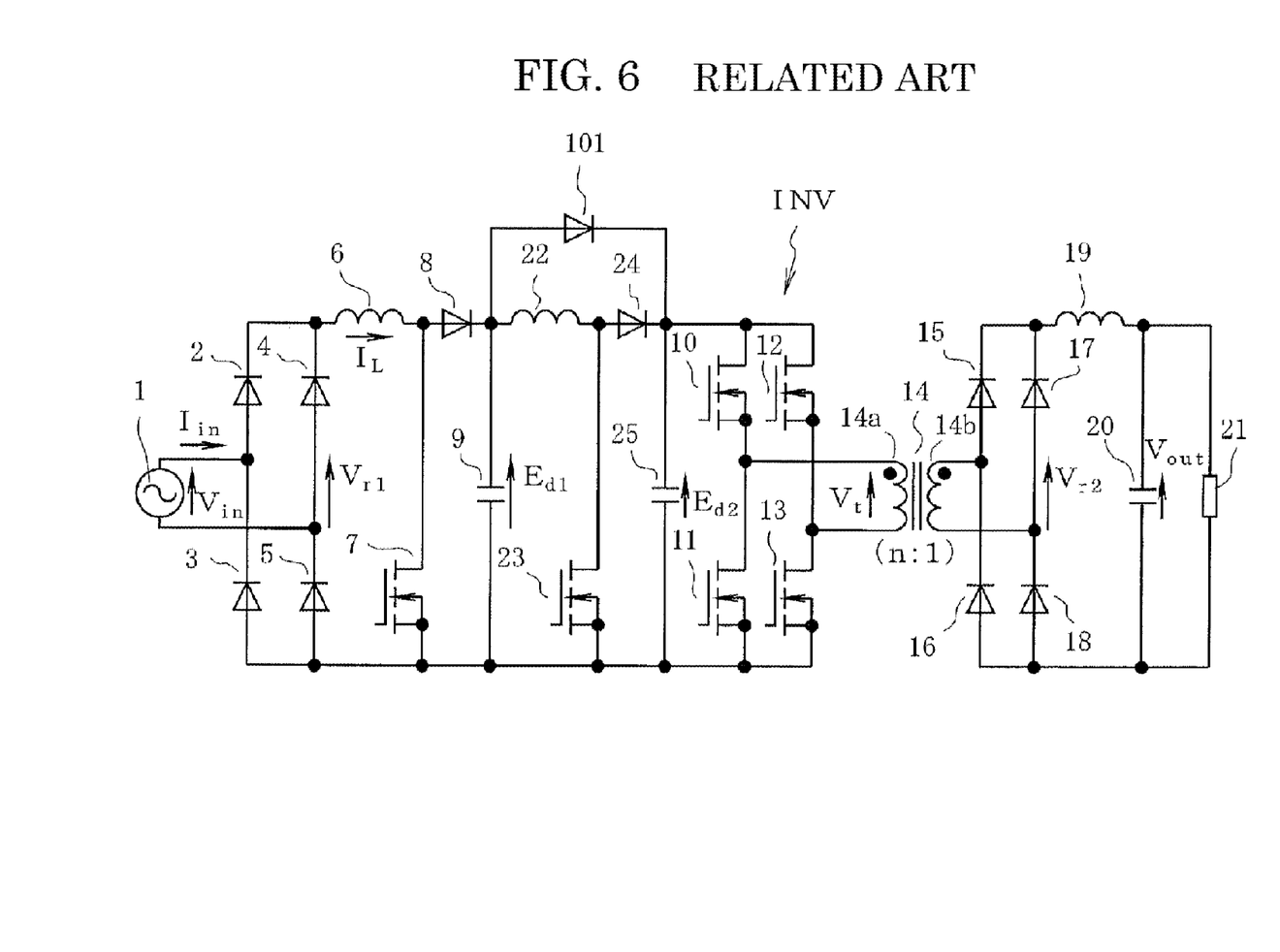
FIG. 6 is a circuit diagram showing third heretofore known technology.

The circuit shown in FIG. 6 is known as third heretofore known technology whereby the above-described increase in the size of the device is avoided.

In FIG. 6, reference sign 101 is a bypass diode connected between the cathodes of the diodes 8 and 24, while the other configurations are the same as in FIG. 5. At a normal time when the alternating current power supply 1 is sound, the switching device 23 does not operate, and the step-up chopper formed of the inductor 22, switching device 23, diode 24, and capacitor 25 is bypassed by the diode 101. Herein, as the voltages $E_{d1}$ and $E_{d2}$ are smoothed direct current voltages both at a normal time and when there is a instantaneous voltage drop, the diode 101, unlike the diode 24, does not need to be capable of rectifying a high frequency, so it is possible to use a low speed diode. As the forward voltage of a low speed diode is in the region of one-half compared to that of a high speed diode, and no current flows through the inductor 22 at a normal time, it is possible to reduce loss considerably in comparison with that in the circuit of FIG. 5.

Furthermore, as the time for which the inductor 22 is energized is a few tens of milliseconds or less when there is an instantaneous voltage drop, it is possible to use a short time rated inductor with thin windings as the inductor 22, and thus possible to reduce the size of the inductor 22 considerably in comparison with that in the circuit of FIG. 5. Also, as there is no longer an inductor interposed between the smoothing capacitor 9 and inverter INV owing to the bypassing operation of the diode 101, it is possible for the smoothing capacitor 9 to absorb the ripple current of the inverter INV too at a normal time. Because of this, it is sufficient that the smoothing capacitor 25 withstands only the ripple of the step-up chopper and inverter INV during an instantaneous voltage drop period, and thus possible to use a capacitor with an extremely small capacity.

This method is shown in, for example, JP-A-2010-41910 (paragraphs [0040] to [0046], FIG. 1 and the like).

SUMMARY OF THE INVENTION

Meanwhile, in recent years, against a background of global environment problems and the like, ever higher efficiency has been required of power supply devices too. Because of this, thorough loss reduction is seen to be needed, and a need to also reduce loss caused by the bypass diode 101 has newly arisen.

To date, a method commonly called synchronous rectification has been known as a method of reducing loss caused by a diode, wherein synchronous rectification is such that the diode is substituted with MOSFETs. It is known that a MOSFET not only causes current to flow in a forward direction, that is, from the drain to the source, when voltage is applied to the gate, but also causes current to flow in a reverse direction, that is, from the source to the drain. As a MOSFET in a conductive condition has a property such that the resistivity, that is, the voltage drop, is proportional to the current, the voltage drop is smaller than that of a diode within a range wherein the conducting current is small with respect to the current capacity. Utilizing this, the diode 101 of FIG. 6 is substituted with MOSFETs, and it is possible to suppress loss by increasing the number of parallel MOSFETs or current capacity thereof, that is, by reducing the resistance value when conductive (hereafter called the on-state resistance).

However, the voltage drop of the diode 101 is already in the region of 1V or less, and when using MOSFETs with the same breakdown voltage and specifications as, for example, the switching device 7 in order to obtain the advantage of reducing the voltage drop sufficiently with respect to the voltage drop of the diode 101, it is necessary that the number of parallel MOSFETs is equivalent to the number of switching devices 7, which leads to a rise in the device cost.

Therefore, an object of the invention is to provide a power supply device wherein loss caused by a heretofore known bypass diode is reduced without leading to a rise in cost.

In order to achieve the object, a power supply device according to a first aspect of the invention includes a rectifier circuit that rectifies an alternating current power supply voltage, a first semiconductor switching device for controlling an input current waveform of the rectifier circuit to a sinusoidal wave, a smoothing capacitor to which the output voltage of the rectifier circuit is applied, and an inverter, into a direct current side of which the voltage across the smoothing capacitor is input via a step-up chopper. The inverter converts a direct current input voltage into alternating current voltage and supplies the alternating current voltage to a load. The step-up chopper includes an inductor and diode mutually connected in series to a positive side direct current bus between the smoothing capacitor and inverter and a second semiconductor switching device connected between a connection point of the inductor and diode and a negative side direct current bus. The power supply device further includes an instantaneous voltage drop compensation function whereby the energy of the smoothing capacitor is supplied by an operation of the step-up chopper to the inverter when there is an instantaneous voltage drop in the alternating current power supply voltage and the output voltage of the inverter is maintained at a constant value.

Further, the aspect of the invention is such that a plurality of MOSFETs with a breakdown voltage lower than that of the first semiconductor switching device are connected in series between a connection point of the smoothing capacitor and inductor and a connection point of the diode and inverter.

The plurality of MOSFETs can be turned on in a condition wherein the potential difference across the series circuit of the MOSFETs is practically zero.

In other words, it can be advantageous when the plurality of MOSFETs are turned on at a time of normal operation other than when there is an instantaneous voltage drop in the alternating current power supply voltage, in a condition wherein the step-up chopper does not operate, and the voltage of the smoothing capacitor and the direct current input voltage of the inverter are practically equal.

Also, the plurality of MOSFETs can be driven by the same gate drive circuit, and a diode can be connected between the gate electrode of at least one of the plurality of MOSFETs and the gate drive circuit.

A direct current power supply having the potential of the connection point of the smoothing capacitor and inductor as a reference potential may be used as a drive power supply of the gate drive circuit, or alternatively, a capacitor in which a charge is accumulated by a turning on and off of the first semiconductor switching device and a fixed voltage element that keeps the voltage of the capacitor constant may be included instead of the direct current power supply.

The power supply device according to the aspect of the invention can be configured as an isolated AC-DC conversion device wherein the alternating current output voltage of the inverter is isolated and converted by a transformer, and the output voltage of the transformer is rectified by a rectifier circuit and supplied to a load.

According to the invention, it is possible to realize a highly efficient, small-sized, low cost power supply device by reducing loss caused by a heretofore known bypass diode that bypasses a step-up chopper, and simplifying the drive power supply of a series circuit of MOSFETs connected instead of the bypass diode.

DETAILED DESCRIPTION OF THE INVENTION

Hereafter, a description will be given, based on the drawings, of embodiments of the invention.

Figure 1:
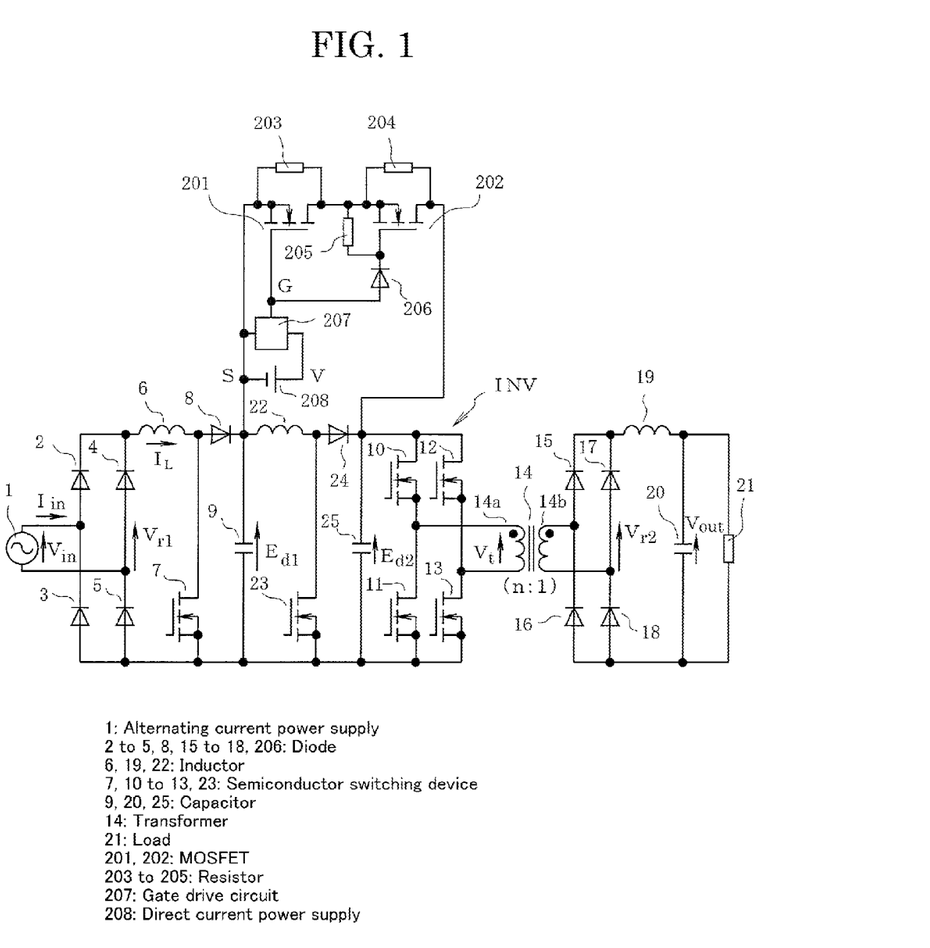
FIG. 1 is a circuit diagram showing a first embodiment of the invention.

FIG. 1 is a circuit diagram showing a first embodiment of the invention. The first embodiment is such that the circuit described hereafter is added to the circuit shown in FIG. 5. The same reference signs are given to portions the same as those in FIG. 5, and a description thereof is omitted.

That is, MOSFETs 201 and 202 are connected in series between the cathode of a diode 8 and the cathode of a diode 24, and resistors 203 and 204 with equal resistance values are connected between the source electrode and gate electrode of the MOSFETs 201 and 202 respectively. Also, 207 is a gate drive circuit, and a direct current power supply 208 is connected to both ends of the gate drive circuit 207. A gate drive signal G output from the gate drive circuit 207 is input directly into the gate electrode of the one MOSFET 201, and input via a diode 206 into the gate electrode of the other MOSFET 202. Furthermore, a resistor 205 is connected between the gate electrode and source electrode of the MOSFET 202.

In the above-described configuration, devices with a breakdown voltage lower than that of a first semiconductor switching device 7, formed of a MOSFET, are used as the MOSFETs 201 and 202. In FIG. 1, another semiconductor switching device 23, formed of a MOSFET, is referred to as a second semiconductor switching device.

Herein, in a circuit in which a voltage $E_{d1}$ of a smoothing capacitor 9 is in the region of 400V, a device with a breakdown voltage of 500V or 600V is commonly used as the switching device 7, but the breakdown voltage of both the MOSFETs 201 and 202 is 100V. The voltage applied to the series circuit of the MOSFETs 201 and 202 is a voltage equivalent to the difference between $E_{d2}$ and $E_{d1}$, meaning in practical terms that the lower limit value of $E_{d1}$ when the smoothing capacitor 9 discharges on the occurrence of an instantaneous voltage drop is in the region of one-half of $E_{d2}$. For example, when $E_{d2}$ is 400V, the lower limit value of $E_{d1}$ is in the region of 200V. This is because, as it is necessary to increase the circuit current in inverse proportion to the voltage drop in order to obtain the same power, it is not advisable in terms of part current capacity to cause the smoothing capacitor 9 to discharge until $E_{d1}$ becomes too low.

Under the conditions whereby $E_{d2}$ is 400V and the lower limit value of $E_{d1}$ is in the region of 200V, the voltage applied to the series circuit of the MOSFETs 201 and 202 is 200V or less, which can sufficiently accommodate a case wherein two MOSFETs with a breakdown voltage of 100V are connected in series. Herein, the characteristics of MOSFETs with a breakdown voltage of in the region of 100V or less have noticeably improved in recent years, and MOSFETs with an extremely low on-state resistance are commercially available. Because of this, even when a plurality of small MOSFETs with a breakdown voltage of 100V or less are connected in series, it is possible for the series on-state resistance to be considerably lower than the on-state resistance of the switching device 7.

Note that a series connection of switching devices is generally more difficult than a parallel connection. This is because, as the drive potential of each series device is different, it is necessary to individually provide drive circuits with independent potential, which is disadvantageous in terms of size and cost, and also because a voltage unbalance occurs in each device when switching in the event of even a slight difference in timing between the drive circuits, and there is a danger of overvoltage breakdown being caused in a device in which voltage is concentrated. Consequently, it is almost always the case that a series connection of switching devices is carried out unavoidably in a case such as when the breakdown voltage in a high voltage circuit is insufficient with one device, and it is rare that switching devices with low breakdown voltage are deliberately connected in series under conditions whereby it is possible to secure breakdown voltage without connecting in series.

In the embodiment under discussion, however, on the voltage $E_{d1}$ starting to drop on the occurrence of an instantaneous voltage drop, the MOSFETs 201 and 202 are turned off before the switching device 23 starts switching, and the MOSFETs 201 and 202 are turned on again under conditions whereby the instantaneous voltage drop is finished, the voltage $E_{d1}$ rises again, and the switching device 23 has stopped switching. That is, as switching of the MOSFETs 201 and 202 is carried out only when almost no voltage is applied to the series circuit thereof, there is no need to align the switching timings between the MOSFETs 201 and 202. Also, as there is no problem with switching loss for the same reason, there is no need for the kind of high speed switching that is carried out within, for example, 1 µs, and it is sufficient that switching is possible in a time, for example, a few microseconds, such that it is possible to respond to a circuit voltage change.

Because of this, according to the embodiment, it is possible to configure the drive circuit of the MOSFETs 201 and 202 extremely easily. In FIG. 1, the gate drive circuit 207 carries out an operation connecting a G point in the drawing to one of a V point or S point (reference potential points) at either end of the direct current power supply 208, and carries out a switching of the MOSFET 201 by adjusting the gate-to-source voltage of the MOSFET 201 to the voltage of the direct current power supply 208 or to 0V. Herein, as the MOSFET 201 is turned on and the voltage across the MOSFET 201 becomes extremely low when voltage is applied between the G point and S point, a voltage practically equivalent to the voltage of the direct current power supply 208 is also applied to the gate of the MOSFET 202, and the MOSFET 202 is also turned on.

Meanwhile, when the voltage between the G point and S point is 0V, the MOSFET 201 is turned off, the gate-to-source parasitic capacitance (not shown) of the MOSFET 202 is discharged by the resistor 205, and the gate-to-source voltage of the MOSFET 202 also presently becomes 0V, because of which the MOSFET 202 is also turned off.

When $E_{d2}$ becomes higher than $E_{d1}$ owing to a step-up chopper operation, the source potential of the MOSFET 202 becomes higher than the potential of the S point, but as the diode 206 shares the difference in potential from that of the gate drive circuit 207 at this time, excessive reverse voltage is prevented from being applied between the gate and source of the MOSFET 202. Also, the voltage of the MOSFETs 201 and 202 at this time is divided practically equally between the resistors 203 and 204.

As described above, when taking into consideration the appropriate conditions in the circuit of FIG. 1, that is, that switching is carried out in a condition wherein almost no voltage is applied to the series circuit of the MOSFETs 201 and 202 and that high speed is not required in the switching of the MOSFETs 201 and 202, no problem occurs even when using the MOSFETs 201 and 202 connected in series.

The same kind of operation is also possible in a circuit wherein three or more MOSFETs with a breakdown voltage lower than that of the switching device 7 are connected in series, although not shown in the drawing, by the gates of MOSFETs from the second stage onward being connected via a diode to the same gate drive circuit 207, in the same way as the MOSFET 202 in FIG. 1, and the MOSFETs being turned on sequentially from the first stage MOSFET 201.

Figure 2:
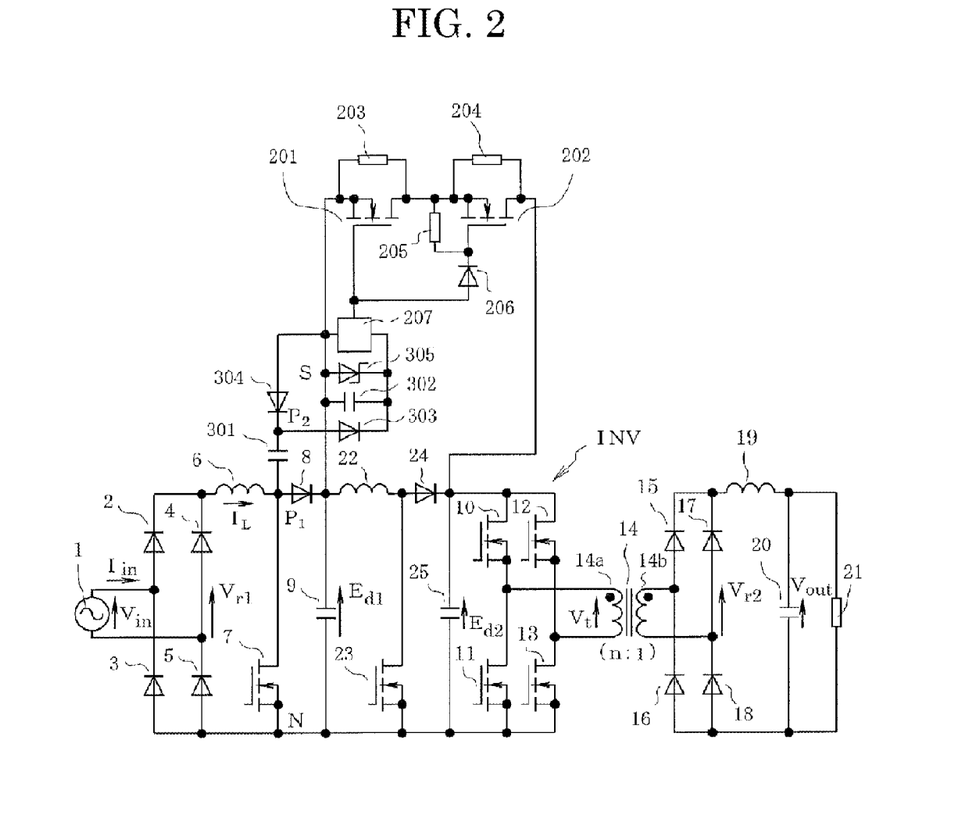
FIG. 2 is a circuit diagram showing a second embodiment of the invention.

Next, FIG. 2 is a circuit diagram showing a second embodiment of the invention. The second embodiment relates to the configuration of the direct current power supply 208 in FIG. 1.

In FIG. 2, a parallel circuit of a Zener diode 305 and capacitor 302 is connected to both ends of the gate drive circuit 207, and diodes 303 and 304 are connected in series with the polarity shown in the drawing to either end of the parallel circuit. Also, a connection point $P_2$ of the diodes 303 and 304 is connected to the anode of the diode 8 via a capacitor 301.

As the potential of the S point in FIG. 1 differs from the source potential (an N point potential) of the switching devices 7 and 23, it is necessary to drive the MOSFETs 201 and 202 with the direct current power supply 208, which has a reference potential differing from that of the drive circuits of the switching devices 7 and 23. However, as the MOSFETs 201 and 202 are substitutes for a diode 101 of FIG. 6, which intrinsically has no need of a drive circuit, it is not desirable that the device should increase in size and the cost rise due to the drive power supply, or the like, of the MOSFETs 201 and 202.

Therefore, the second embodiment shown in FIG. 2 is for easily realizing a MOSFET 201 and 202 drive power supply with a reference potential differing from that of the switching devices 7 and 23.

The MOSFETs 201 and 202 are turned on at a time of steady state operation, and at this time, the switching device 7 carries out switching. The potential of a $P_1$ point with respect to the N point of FIG. 2 varies at a high frequency between the voltage $E_{d1}$ and 0V owing to the switching operation of the switching device 7.

On the switching device 7 being turned on, current flows along a path from the smoothing capacitor 9 through the diode 304, capacitor 301, and switching device 7 to the smoothing capacitor 9, and the capacitor 301 is charged to a voltage practically equivalent to $E_{d1}$, for example, 400V. On the switching device 7 being turned off, the potential of the $P_1$ point rises, and the diode 8 presently becomes conductive, because of which the potential of the $P_1$ point becomes practically equivalent to the potential of the S point. As the potential of a $P_2$ point in the drawing becomes higher than that of the S point through this process, current flows along a path from the capacitor 301 through $P_2$, the diode 303, and the capacitor 302 to the S point, and a charge accumulated in the capacitor 301 shifts to the capacitor 302.

The voltage of a capacitor is inversely proportional to the capacitance thereof, because of which, when the capacitance of the capacitor 301 is set to, for example, one-thousandth of that of the capacitor 302, a charge of 400V accumulated in the capacitor 301 is shifted to the capacitor 302 by one switching of the switching device 7, and the voltage of the capacitor 302 rises by 0.4V.

When the above-described operation is repeated by the high frequency switching of the switching device 7, the voltage of the capacitor 302 gradually rises, but the power consumed by the gate drive circuit 207 and resistor 205 increases, because of which, in principle, the power supplied from the capacitor 302 and the power consumed by the gate drive circuit 207 and the like become balanced at a certain point, and the voltage of the capacitor 302 becomes constant. In practice, as it is difficult to manage the voltage at the point of balance, the voltage of the capacitor 302 is limited to a constant value by the Zener diode 305 connected in parallel to the capacitor 302.

As is well known, hardly any power is consumed at the gate while a MOSFET is maintained in an on-state, because of which, it is possible to use small parts with an extremely small current capacity as the capacitors 301 and 302, diodes 303 and 304, and Zener diode 305. A charge is temporarily supplied from the capacitor 302 at the moment at which the MOSFETs 201 and 202 are turned on. In this way, as the power needed to drive the MOSFETs 201 and 202 is extremely low on average, unlike a device that carries out high frequency switching like the switching device 7, it is possible to configure the drive power supply of the MOSFETs 201 and 202 more easily than with a method such as using, for example, an isolated DC/DC converter.

The power supply device of the invention can be utilized in applications that supply a constant voltage to various kinds of load such as information and communication instruments, even when there is an instantaneous voltage drop in an alternating current power supply voltage, using an instantaneous voltage drop compensation function.

What is claimed is:

1. A power supply device, comprising:
    a rectifier circuit that rectifies an alternating current power supply voltage;
    a first semiconductor switching device for controlling an input current waveform of the rectifier circuit to a sinusoidal wave;
    a smoothing capacitor to which an output voltage of the rectifier circuit is applied;
    a step-up chopper that steps up a voltage across the smoothing capacitor; and
    an inverter that converts a direct current output voltage of the step-up chopper into an alternating current output voltage and supplies the alternating current output voltage to a load,
    the step-up chopper including an inductor and a diode mutually connected in series to a positive side direct current bus between the smoothing capacitor and inverter and a second semiconductor switching device connected between a connection point of the inductor and diode and a negative side direct current bus,
    and the power supply device further comprising an instantaneous voltage drop compensation function whereby an energy of the smoothing capacitor is supplied by an operation of the step-up chopper to the inverter when there is an instantaneous voltage drop in the alternating current power supply voltage and an output voltage of the inverter is maintained at a constant value, wherein
    a plurality of MOSFETs with a breakdown voltage lower than a breakdown voltage of the first semiconductor switching device are connected in series between a connection point of the smoothing capacitor and inductor and a connection point of the diode and inverter;
    wherein
        the plurality of MOSFETs are turned on in a condition wherein a potential difference across the plurality of MOSFETs is practically zero;
        the plurality of MOSFETs are driven by a same gate drive circuit; and
        a diode is connected between a gate electrode of at least one of the plurality of MOSFETs and the gate drive circuit.

2. The power supply device according to claim 1, wherein the plurality of MOSFETs are turned on at a time of normal operation other than when there is an instantaneous voltage drop in the alternating current power supply voltage.

3. The power supply device according to claim 2, further comprising
a transformer that isolates and converts the alternating current output voltage of the inverter and a rectifier circuit that rectifies an output voltage of the transformer to output a rectified transformer output voltage, wherein the rectified transformer output voltage of the rectifier circuit is supplied to the load.

4. The power supply device according to claim 2, wherein the plurality of MOSFETs are driven by a same gate drive circuit.

5. The power supply device according to claim 1, wherein a direct current power supply having a potential of the connection point of the smoothing capacitor and inductor as a reference potential is connected to the gate drive circuit.

6. The power supply device according to claim 5, further comprising
a transformer that isolates and converts the alternating current output voltage of the inverter and a rectifier circuit that rectifies an output voltage of the transformer to output a rectified transformer output voltage, wherein the rectified transformer output voltage of the rectifier circuit is supplied to the load.

7. The power supply device according to claim 1, further comprising
a capacitor in which a charge is accumulated by a turning on and off of the first semiconductor switching device and a fixed voltage element that keeps a voltage of the capacitor constant.

8. The power supply device according to claim 7, further comprising
a transformer that isolates and converts the alternating current output voltage of the inverter and a rectifier circuit that rectifies an output voltage of the transformer to output a rectified transformer output voltage, wherein the rectified transformer output voltage of the rectifier circuit is supplied to the load.

9. The power supply device according to claim 1, further comprising
a transformer that isolates and converts the alternating current output voltage of the inverter and a rectifier circuit that rectifies an output voltage of the transformer to output a rectified transformer output voltage, wherein the rectified transformer output voltage of the rectifier circuit is supplied to the load.

* * * * *